United States Patent
Peichel

(10) Patent No.: US 12,507,934 B2
(45) Date of Patent: Dec. 30, 2025

(54) ENHANCED TELEMETRY OF A MEDICAL SYSTEM VIA IMPROVED LINK QUALITY FOR A MEDICAL DEVICE

(71) Applicant: Medtronic, Inc., Minneapolis, MN (US)

(72) Inventor: David J. Peichel, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 297 days.

(21) Appl. No.: 18/185,659

(22) Filed: Mar. 17, 2023

(65) Prior Publication Data
US 2023/0309894 A1    Oct. 5, 2023

Related U.S. Application Data

(60) Provisional application No. 63/362,353, filed on Apr. 1, 2022.

(51) Int. Cl.
  *A61B 5/00*  (2006.01)
  *A61B 5/318*  (2021.01)
(52) U.S. Cl.
  CPC .............. *A61B 5/318* (2021.01); *A61B 5/686* (2013.01); *A61B 5/7264* (2013.01)
(58) Field of Classification Search
  CPC ................................................ A61N 1/37252
  See application file for complete search history.

(56) References Cited

U.S. PATENT DOCUMENTS

| | | |
|---|---|---|
| 7,580,755 B1 | 8/2009 | Schwartz et al. |
| 8,433,420 B2 | 4/2013 | Bange et al. |
| 9,480,847 B2 | 11/2016 | Greene et al. |
| 10,357,158 B2 | 7/2019 | Patel |
| 10,420,948 B2 | 9/2019 | Masoud et al. |
| 11,006,296 B2 | 5/2021 | Pei |
| 2007/0186130 A1 | 8/2007 | Holm et al. |
| 2014/0169162 A1* | 6/2014 | Romano .............. A61B 5/0015 370/230 |
| 2018/0323865 A1 | 11/2018 | Ludwig et al. |
| 2019/0125271 A1 | 5/2019 | Garudadri et al. |
| 2019/0282819 A1 | 9/2019 | Schilling et al. |
| 2020/0238089 A1 | 7/2020 | Demmer et al. |
| 2020/0344825 A1 | 10/2020 | Wu et al. |
| 2020/0352441 A1 | 11/2020 | Soykan et al. |

FOREIGN PATENT DOCUMENTS

WO    2019132981 A1    7/2019

\* cited by examiner

*Primary Examiner* — Alyssa M Alter
(74) *Attorney, Agent, or Firm* — Shumaker & Sieffert, P.A.

(57) ABSTRACT

This disclosure is directed to systems and techniques for enhancing memory interrogations of a medical device by an external device. In some examples, the systems and techniques overcome issues of poor link quality, particularly when the memory stores time-sensitive and critical patient information, by reducing an individual packet size to fit an allotted time period for the transmission. Based on satisfaction of at least criterion for the communication channel, the systems and techniques direct the medical device to transmit, from the memory and over the communication channel, a number of packets comprising duplicate copies of the packetized dataset, wherein a number of the duplicate copies is set to be commensurate with a reduction to the individual packet size.

20 Claims, 5 Drawing Sheets

ENHANCED TELEMETRY OF A MEDICAL SYSTEM VIA IMPROVED LINK QUALITY FOR A MEDICAL DEVICE

This application claims the benefit of U.S. Provisional Application Ser. No. 63/362,353, filed Apr. 1, 2022, which is entitled "ENHANCED TELEMETRY OF A MEDICAL SYSTEM VIA IMPROVED LINK QUALITY FOR A MEDICAL DEVICE" and is incorporated by reference herein in its entirety.

FIELD

The disclosure relates generally to medical systems and, more particularly, medical systems configured to enable interrogations of a medical device for patient data.

BACKGROUND

Medical systems may monitor various types of data of a patient or a group of patients for one or several purposes. Amongst the numerous examples, some medical systems may record measurements of a patient and their heart as indicia of cardiac health for that patient, which may be memorialized as time-stamped patient information in raw data and/or processed data formats; as one example, electric signals representing cardiac activity over a period of time may be memorialized as a cardiac electrogram (EGM), and then processed into other indicia of the cardiac health of the patient. In some examples, the medical system may monitor the cardiac EGM to detect one or more types of arrhythmia, such as bradycardia, tachycardia, fibrillation, or asystole (e.g., caused by sinus pause or AV block).

Medical professionals may use the medical system on their patients for a number of reasons such as having the medical system record patient information for future use. Some medical professionals rely on that data to provide their patients with the best medical care. For various purposes, a medical professional may program the medical system to operate as desired, which may be in accordance with a certain algorithm, and calibrate medical system components to record the patient information and then, detect health events, deliver a therapy, and so forth. In some examples, the medical system may include one or more of an implantable medical device or a wearable device to collect various measurements used to detect changes in patient cardiac health. In some examples, an implantable or a wearable medical device may be configured with upload the patient information to other devices in the medical system. In some examples, a medical device may deliver therapy to the patient, e.g., cardiac pacing, based on the monitored data of the patient.

SUMMARY

Medical systems and techniques as described herein enhance medical device operation by enabling low-latency and accurate memory interrogations as a service for an external device to invoke at any point-in-time. In general, there are devices configured to perform a number of medical functions, and these devices rely on time-stamped patient information provided by medical devices for their performance.

The present disclosure describes embodiments of computerized devices capable of transmitting that patient information to at least another device despite a weak signal. A number of these devices are described herein as any one of a variety of medical devices (e.g., implantable devices, wearable devices, etc.) that may be configured to monitor patient activity and at certain times (e.g., periodically), upload various patient information memorializing any time period of the monitored patient activity. The present disclosure further describes a patient having an example medical device, who also has an external computing device to support health event monitoring and detection operations of the medical device. The external computing device may be configured to invoke memory interrogations for data stored in medical device memory and receive packetized datasets comprising the patient information of interest for use in some functionality supporting the health event monitoring and detection operations. The patient information of interest may be time-stamped and/or transmitted to an external device in real-time or near real-time, even in cases where the above link quality is poor, for example, as denoted by a dropped packet measurement exceeding a suprathreshold.

While conventional medical devices have challenges with properly transmitting the patient information, a medical device in accordance with the present disclosure overcomes these challenges by sending multiple copies of the same patient information, e.g., when a link quality of a communication channel with an external computing device degrades, which may be indicated by the above suprathreshold number or rate of dropped packets, thereby providing as an on-demand service for memory interrogations by the external computing device. To illustrate by way of way of an example, the medical device may record and then, transmit duplicates of patient information in packetized datasets regardless of link quality, and for at least this reason, the medical device may prepare for and then, initiate transmission of the contemporaneous with recording and storing the patient information.

As described herein, there are a number of reasons for the link quality of the communication channel to degrade. In some examples, the degradations may be cyclical, such as when the medical device is implanted on or within the heart and the patient's cardiac cycle causes a relatively high number of packets to dropout during transmission. For instance, one challenge with coupled coil telemetry within implanted medical devices in or on the heart is that contractions of the patient's heart causes coupled coils to cycle through a null in the coupling between said coils causing a momentary dropout in the ability of the telemetry circuitry to successfully upload the patient information. These dropouts can cause drops in the telemetered ECG signal, missed markers, and can disrupt or delay the completion of an interrogation of medical device memory.

A successful memory interrogation submits patient information to detect changes in the patient's health that correlate to changes in data recording the patient's physiology and/or activity. Therefore, having medical systems capable of successful memory interrogations regardless of link quality mitigates or eliminates altogether the problems associated with other approaches, such as a tendency for inaccurate and/or false determinations. In view of the above, the present disclosure describes a technological improvement or a technical solution that is integrated into a practical application.

Clause 1: A medical system in which a medical device of a patient is communicatively coupled to a computing device, the medical system includes memory storing a dataset of time-stamped patient information for upload over a time period via a communication channel between the medical device and the computing device; and processing circuitry configured to: determine that at least one link quality criterion for the communication channel is satisfied by link quality information of the communication channel; and based on satisfaction of the at least one link quality criterion, transmit, from the memory and over the communication channel, a number of packets comprising duplicate copies of the packetized dataset with an individual packet size reduction, wherein a number of the duplicate copies is set to be commensurate with the individual packet size reduction.

Clause 2: The medical system of clause 1, wherein to transmit the number of packets, the processing circuitry is further configured to: determine a number of duplicate copies of each of the packets based on at least one of a packet drop rate, a dropout time period, or the individual packet size reduction.

Clause 3: The medical system of any of clauses 1 and 2 or 2, wherein to transmit the number of packets, the processing circuitry is further configured to: determine the individual packet size reduction based on the link quality information of the communication channel.

Clause 4: The medical system of any of clauses 1-3, wherein to transmit the number of packets, the processing circuitry is further configured to: determine that the satisfaction of the at least one link quality criterion indicates poor link quality.

Clause 5: The medical system of any one of clauses 1-4, wherein to transmit the number of packets, the processing circuitry is further configured to: schedule the upload of the time-stamped patient information for a time period based on the link quality information.

Clause 6: The medical system of clause 5, wherein to transmit the number of packets, the processing circuitry is further configured to: based on an individual packet size, determine an amount of the time period to allot for the upload of the packetized dataset.

Clause 7: The medical system of any one of clauses 1-4, wherein to transmit the number of packets, the processing circuitry is further configured to: synchronize the upload of the time-stamped patient information for a time interval of a patient cardiac cycle based on a corresponding packet rate of that time interval.

Clause 8: The medical system of clause 7, wherein to transmit the number of packets, the processing circuitry is further configured to: schedule subsequent uploads of time-stamped patient information for the time interval of the patient cardiac cycle; and in response to updated link quality information, adjust the time period of the patient cardiac cycle and synchronize a next upload of time-stamped patient information for the adjusted time period of the patient cardiac cycle.

Clause 9: The medical system of any one of clauses 1-8, wherein the time period corresponds to heart contractions of the patient causing an antenna of the medical device to cycle through a null in a coupling between the antenna and an antenna of the computing device.

Clause 10: The medical system of clause 9, wherein the satisfaction of the at least one link quality criterion indicates a weak signal and wherein to transmit the number of packets, the processing circuitry is further configured to: resend one or more of the number of packets to cause an increase in a communication success rate of the medical device.

Clause 11: A medical device includes communication circuitry communicatively coupled to a computing device via a communication channel; sensing circuitry configured to sense time-stamped patient information based on signals generated by one or more sensors; memory storing a dataset of the time-stamped patient information for upload over a time period via the communication circuitry; and processing circuitry configured to: determine that at least one link quality criterion for a communication channel between the medical device and the computing device is satisfied by link quality information of the communication channel; and based on satisfaction of the at least one link quality criterion, transmit, from the memory and over the communication channel, a number of packets comprising duplicate copies of the packetized dataset with an individual packet size reduction, wherein a number of the duplicate copies is set to be commensurate with the individual packet size reduction.

Clause 12: The medical device of clause 11, wherein the one or more sensors comprise at least one electrode configured to sense electrical activity of the time-stamped patient information.

Clause 13: The medical device of any of clauses 11 and 12 or 12, wherein the say sensing circuitry is further configured to sense a cardiac electrogram (EGM) via at least one electrode.

Clause 14: The medical device of any one of clauses 11-13 further comprising a housing configured to contain the communication circuitry, the memory, and the processing circuitry, wherein the housing is configured to be implanted at least one of within or on a heart of the patient.

Clause 15: The medical device of any one of clauses 11-14, wherein to transmit the number of packets, the processing circuitry is further configured to: determine a number of duplicate copies of each of the packets based on the individual packet size reduction.

Clause 16: The medical device of any one of clauses 11-15, wherein to transmit the number of packets, the processing circuitry is further configured to: determine the reduction to the individual packet size based on the link quality information of the communication channel.

Clause 17: The medical device of any one of clauses 11-16, wherein to transmit the number of packets, the processing circuitry is further configured to: determine a number of duplicate copies of each of the packets based on at least one of a packet drop rate or a dropout time period.

Clause 18: The medical device of any one of clauses 11-17, wherein to transmit the number of packets, the processing circuitry is further configured to: schedule the upload of the time-stamped patient information for a time period based on the link quality information.

Clause 19: The medical device of any one of clauses 11-17, wherein to transmit the number of packets, the processing circuitry is further configured to: synchronize the upload of the time-stamped patient information for a time interval of a patient cardiac cycle based on a corresponding packet drop rate for that time interval.

Clause 20: The medical device of clause 19, wherein to transmit the number of packets, the processing circuitry is further configured to: schedule subsequent uploads of time-stamped patient information for the time interval of the patient cardiac cycle; and in response to updated link quality information, adjust the time period of the patient cardiac cycle and synchronize a next upload of time-stamped patient information for the adjusted time period of the patient cardiac cycle.

Clause 21: The medical device of clause 20, wherein the time interval corresponds to heart contractions of the patient causing an antenna of the medical device to cycle through a null in a coupling between the antenna and an antenna of the computing device.

Clause 22: A method performed by processing circuitry of a medical device communicatively coupled to a computing device and part of a medical system includes storing, in memory of the medical device, a packetized dataset of time-stamped patient information for upload over a communication channel between the medical device and the computing device via communication circuitry of the medical device; determining that at least one link quality criterion for the communication channel between the medical device and the computing device is satisfied by link quality information of the communication channel; and based on satisfaction of the at least link quality criterion, transmitting, from the memory and over the communication channel, a number of packets comprising duplicate copies of the packetized dataset with an individual packet size reduction, wherein a number of the duplicate copies is set to be commensurate with the individual packet size reduction.

Clause 23: The method of clause 22, wherein transmitting the number of packets further includes determining a number of duplicate copies of each of the packets based on the individual packet size reduction.

Clause 24: The method of any of clauses 22 and 23 or 23, wherein transmitting the number of packets further includes determining the reduction to the individual packet size based on the link quality information of the communication channel.

Clause 25: The method of any one of clauses 22-24, wherein transmitting the number of packets further includes determining a number of duplicate copies of each of the packets based on at least one of a packet drop rate or a dropout time period.

Clause 26: The method of any of clauses 22-25, wherein transmitting the number of packets further includes schedule the upload of the time-stamped patient information for a time period based on the link quality information.

Clause 27: The method of clause 26, wherein transmitting the number of packets further includes based on an individual packet size, determining an amount of the time period to allot for the output device to perform the upload of the packetized dataset.

Clause 28: The method of any of clauses 22-25, wherein transmitting the number of packets further includes synchronizing the upload of the time-stamped patient information for a time interval of a patient cardiac cycle based on a corresponding packet drop rate for the time interval.

Clause 29: The method of clause 28 further includes scheduling subsequent uploads of time-stamped patient information for the time interval of the patient cardiac cycle; and in response to updated link quality information, adjusting the time interval of the patient cardiac cycle and synchronize a next upload of time-stamped patient information for the adjusted time period of the patient cardiac cycle.

Clause 30: The method of clause 29, wherein the time interval corresponds to heart contractions of the patient causing an antenna of the medical device to cycle through a null in a coupling between the antenna and an antenna of the computing device.

Clause 31: A non-transitory computer-readable storage medium comprising program instructions that, when executed by processing circuitry of any medical system of clauses 1-10 and/or of any medical device of clauses 11-21, cause the processing circuitry to perform any method of clauses 22-30.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF THE DRAWINGS

Like reference characters denote like elements throughout the description and figures.

DETAILED DESCRIPTION

Figure 1:
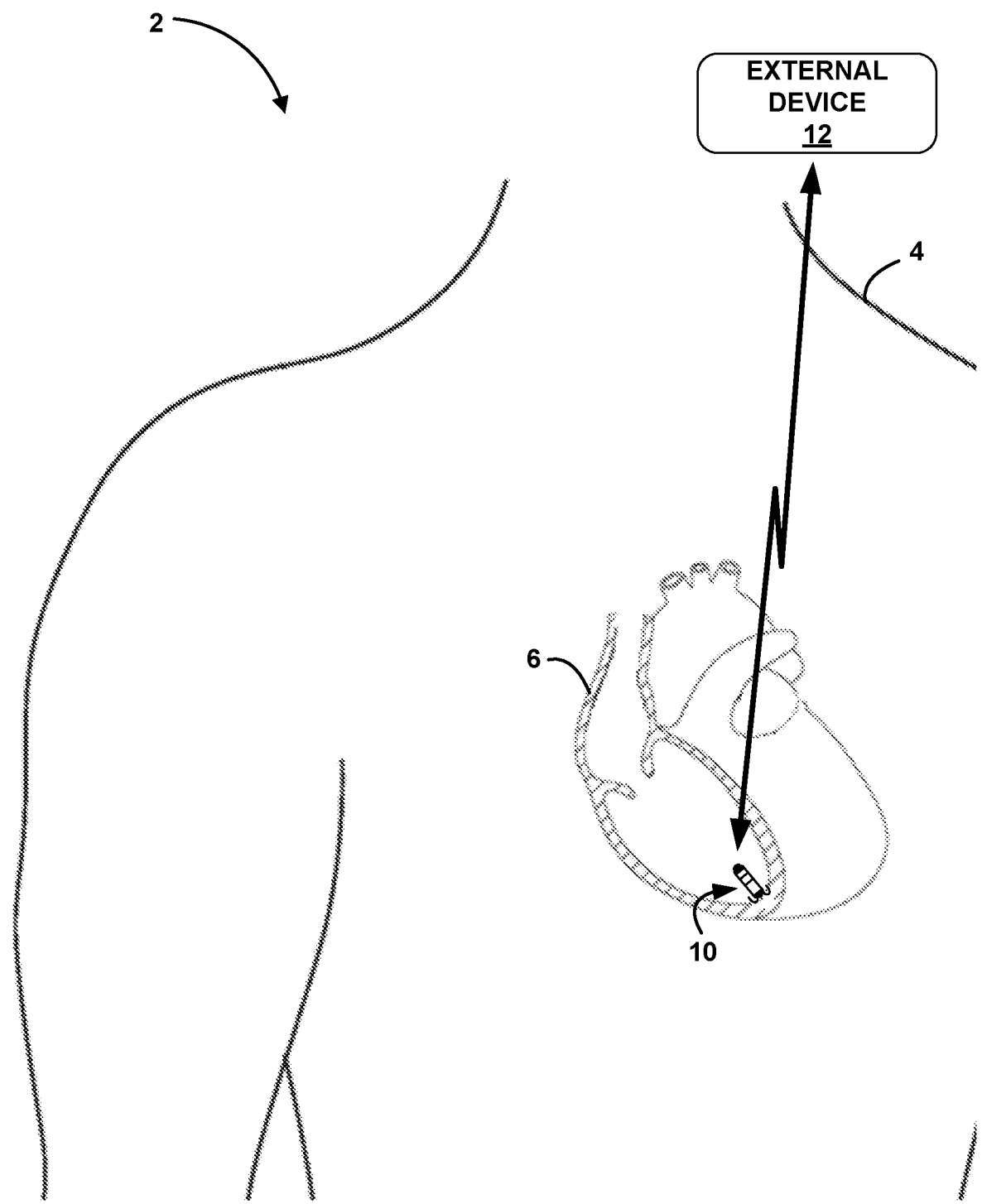
FIG. 1 illustrates example environment of an example medical system in conjunction with a patient, in accordance with one or more examples of the present disclosure.

In general, medical systems according to this disclosure implement techniques for patient health monitoring and heath event detection by facilitating memory integrations from any device(s) collecting patient information. The medical systems described in the present disclosure employ various medical devices for their patient to use, including an implantable or wearable device that uses one or more sensors/electrodes to measure various patient activities and records such measurements as patient activity data is described herein as example medical devices. The techniques described herein enable the various medical devices to upload the patient activity data and any other patient information to a computing device over a communication channel having a poor link quality/weak signal.

Example medical devices that may collect patient activity data may include an implantable or wearable cardiac monitoring device, a pacemaker/defibrillator, e.g., an intracardiac, transcatheter, or leadless pacemaker, or a ventricular assist device (VAD). These medical devices provide medical care in some form (e.g., cardiac monitoring) and amongst the numerous medical devices available in the market, LINQ™ & LINQ II™ monitors and Micra™ transcatheter pacemaker are illustrative, namely, for recording time-stamped patient information indicative of cardiac activity and operating with an external computing device to perform a memory integration of that patient information.

Because the patient information provides (e.g., a clinician with) an important aspect of the patient's cardiac health, the above medical devices employ the techniques described herein to ensure a successful transmission of such information (in its entirety), especially when a poor or bad link quality would impede transmission by conventional medical devices. An example technique may direct an implanted medical device to upload time-stamped patient information in duplicate, mitigating the poor or bad link quality even at a relatively high packet drop rate (if necessary). By sending multiple packets with a same payload of patient information, the example medical system is able to overcome a poor link quality expected to cause all but one of the multiple packets to drop.

This example technique may effectuate transmission of an original copy and at least one duplicate copy of the same patient information via a reduction to an individual packet size by an amount that allows the multiple packets to fit within a certain amount of time. This amount may be fractional, representing an individual packet size reduction by a numerical factor commensurate with a number of duplicate copies. In one example medical device, the example technique may enable telemetry hardware to perform redundant uploads of the same patient information during a dropout period caused by that hardware.

By configuring a medical device to achieve a high success rate when performing a memory interrogation for a clinician and a patient, the medical systems described herein mitigate or eliminate issues (e.g., dropped patient information, difficulty operating the medical device, and/or multiple ineffective attempts at a successful upload) that are likely to interfere with the clinician's available time with the patient. In this manner, the techniques of this disclosure may advantageously enable improved accuracy in the detection of changes in patient health and, consequently, better evaluation of the condition of the patient, for example, when the transmission is a real-time or near real-time transmission of recently sensed patient information. When the transmission is an upload of stored patient information (e.g., from memory), the techniques of this disclosure may advantageously enable improved success of that upload, thereby preventing delays to the clinician's schedule and (possibly) reducing total clinician time for the patient. The clinician is prone to a number of delays caused by a number of device issues in addition to unsuccessful uploads, such as device malfunctions and unproductively trying to execute a memory interrogation, to the detriment of the patient. By achieving the high success rate, the medical systems described herein ensure performance of the memory interrogation, thereby allowing the clinician to complete their activities while providing the patient with sufficient medical care.

FIG. 1 illustrates the environment of an example medical system 2 in conjunction with a patient 4, in accordance with one or more techniques of this disclosure. The example techniques may be used with an IMD 10, which may be in wireless communication with at least one of external device 12 and other devices not pictured in FIG. 1. In some examples, IMD 10 is implanted within or otherwise attached to heart 6 of patient 4. IMD 10 may be configured to sense a cardiac EGM via a plurality of electrodes and may sense other physiological signals via the electrodes and/or other sensors. In some examples, IMD 10 delivers therapy, e.g., cardiac pacing via the electrodes.

It should be noted that the present disclosure does not limit IMD 10 to any embodiment and furthermore, describes a number of example medical systems and techniques as being inclusive of any computing device (including non-medical devices) where a dropout period negatively affects memory integrations by an external device. The dropout period generally refers to any time period in which a degradation in a link quality of a (e.g., wireless) communication channel disrupts transmissions of patient information to the external device. The dropout period may refer to a momentary or periodic dropout in the ability of telemetry hardware (e.g., communication circuitry) to transmit and successfully upload the patient information. The dropout period may refer to a specific time interval in a cardiac cycle of patient 4 in which, for instance, a poor link quality causes a relatively high number/rate of dropped packets. For any computing device to properly identify such a dropout, the present disclosure as follows provides a number of examples where link quality information provides insight into which time period (e.g., time interval in cardiac cycle) qualifies as the dropout period. Hence, one or more disruptions to the above transmissions may result from one or more patient activities, for example, patient movement(s) causing IMD 10 to be in different position(s)/orientation(s).

According to some examples of IMD 10, an implanted medical device may be inserted into patient 4 and initially configured to be located in the heart or on the heart. At some point-in-time after the implantation of IMD 10, patient 4 may experience heart contractions that cause coupled coil telemetry to cycle through a null in a coupling between said coils, resulting in an example momentary/periodic dropout in the ability of the communication circuitry to successfully upload the patient information. In some examples, IMD 10 takes the form of the Micra™ transcatheter pacing system available from Medtronic, Inc. of Minneapolis, MN.

IMD 10 and external device 12 are each configured to communicate with each other via wireless communication and, optionally, another computing device (not illustrated in FIG. 1). IMD 10 and/or external device 12, for example, may communicate via near-field communication technologies (e.g., inductive coupling, NFC or other communication technologies operable at ranges less than 10-20 cm) and far-field communication technologies (e.g., radiofrequency (RF) telemetry according to the 802.11 or Bluetooth® specification sets, or other communication technologies operable at ranges greater than near-field communication technologies).

External device 12 may be a computing device with a display viewable by the user and an interface for receiving user input to external device 12. In some examples, external device 12 may be a notebook computer, tablet computer, workstation, one or more servers, cellular phone, personal digital assistant, or another computing device that may run an application that enables the computing device to interact with IMB 10.

External device 12 may be used to configure device settings and/or operational parameters for IMD 10. External device 12 may be used to retrieve data from IMB 10 including datasets of various patient information. The retrieved data may be time-stamped and (e.g., continuously) recorded over a length of time. The retrieved data may include values of patient parameters (e.g., physiological parameters) measured by IMD 10, indications of health events (e.g., episodes of arrhythmia or other maladies) detected by IMD 10, and signals (e.g., sensor signals) recorded by IMD 10. As an example, external device 12 may receive sensor data including raw sensor measurements, processed physiological parameters or other data related to patient monitoring by IMD 10. As another example, external device 12 may retrieve cardiac EGM segments recorded by IMD 10 due to IMB 10 determining that an episode of arrhythmia (e.g., asystole) or another malady occurred during the segment. The retrieved data may also include data related to the operation or state of IMD 10.

As described herein, uploads of different types of the above patient information (e.g., health event data, samples of patient data, longitudinal diagnostic information, and/or the like) may trigger external device 12 into performing some functionality. This may include adjudicating initial detections by IMD 10 of health events (e.g., cardiac events) and if needed, adjusting IMB 10's device settings and/or operational parameters. Any patient information being transmitted by IMD 10 has to reach its destination as a complete dataset; in particular, some patient information that IMD 10 records during a time period may be time-sensitive for that time period (e.g., time-stamped patient information) and thus, runs the risk of going stale if not transmitted by a certain time, regardless of link quality. Even if a communication channel with external device 12 has a poor link quality, resulting in a high packet drop rate, IMD 10 attempts the upload of the time-stamped patient information. For at least this reason, the techniques described herein enable IMD 10 to overcome the poor link quality and achieve a successful transmission of the time-stamped patient information within the specified time period.

As will be discussed in greater detail below with respect to FIG. 5, one or more remote computing devices may interact with IMD 10 in a manner similar to external device 12, e.g., to program IMD 10 and/or retrieve data from IMD 10, via a network. One or more aspects of medical system 2 of FIG. 1 may be implemented with networking infrastructure connecting computing devices of a computing service with IMD 10 and/or external device 12. The computing service may be similar to that provided by the Medtronic CareLink® Network, which communicates with IMD 10 directly over a network connection and/or indirectly through external device 12.

Processing circuitry of medical system 2, e.g., IMD 10, external device 12, and/or one or more other computing devices, may be configured to perform the techniques described herein. The processing circuitry of medical system 2 may employ various known mechanisms to capture dataset(s) (e.g., sample(s)) of various patient information over a period of time and then, analyze the captured dataset(s) of time-stamped patient information for indicia of any health events including non-trivial changes in patient health. For the above analysis, the processing circuitry of medical system 2 may incorporate one or more techniques described herein, thereby arranging accurate transmission(s) of the captured dataset(s), for example, at some point-in-time after the capture of the time-stamped patient information therein. This point-in-time may be selected based on link quality information such that time periods of poor link quality are avoided (unless unavoidable); however, if an upload during a time period cannot be avoided, the processing circuitry of medical system 2 proceeds to schedule the upload for that time period as described herein. According to an example technique, the processing circuitry of medical system 2 prepares the time-stamped patient information by packetizing the corresponding captured dataset(s) into reduced sized packets in anticipation of the above point-in-time and then, schedules an upload to external device 12 for a time period including the above point-in-time.

The processing circuitry of medical system 2 may direct an output device of IMD 10 to perform the starting at a first point-in-time and ending at a second point-in-time, encompassing a time period of bad link quality. The processing circuitry of medical system 2 may determine one or both of the above point-in-times and/or an amount or length of time for the time period based on link quality information. Subsequent uploads of future time-stamped patient information may be synchronized to the time period. In some examples, this time period represents an interval between cardiac events or within a cardiac cycle.

In some examples, the processing circuitry of medical system 2 analyzes a cardiac EGM or ECG and other patient activities sensed by IMD 10 and may identify indicia of a cardiac episode, such as an arrhythmia, or another cardiac event that either has occurred or is occurring in patient 4. Although described in the context of examples in which IMD 10 that senses the cardiac EGM or ECG, example systems including one or more implantable, wearable, or external devices of any type configured to sense the cardiac EGM or ECG may be configured to implement the techniques of this disclosure.

Figure 2:
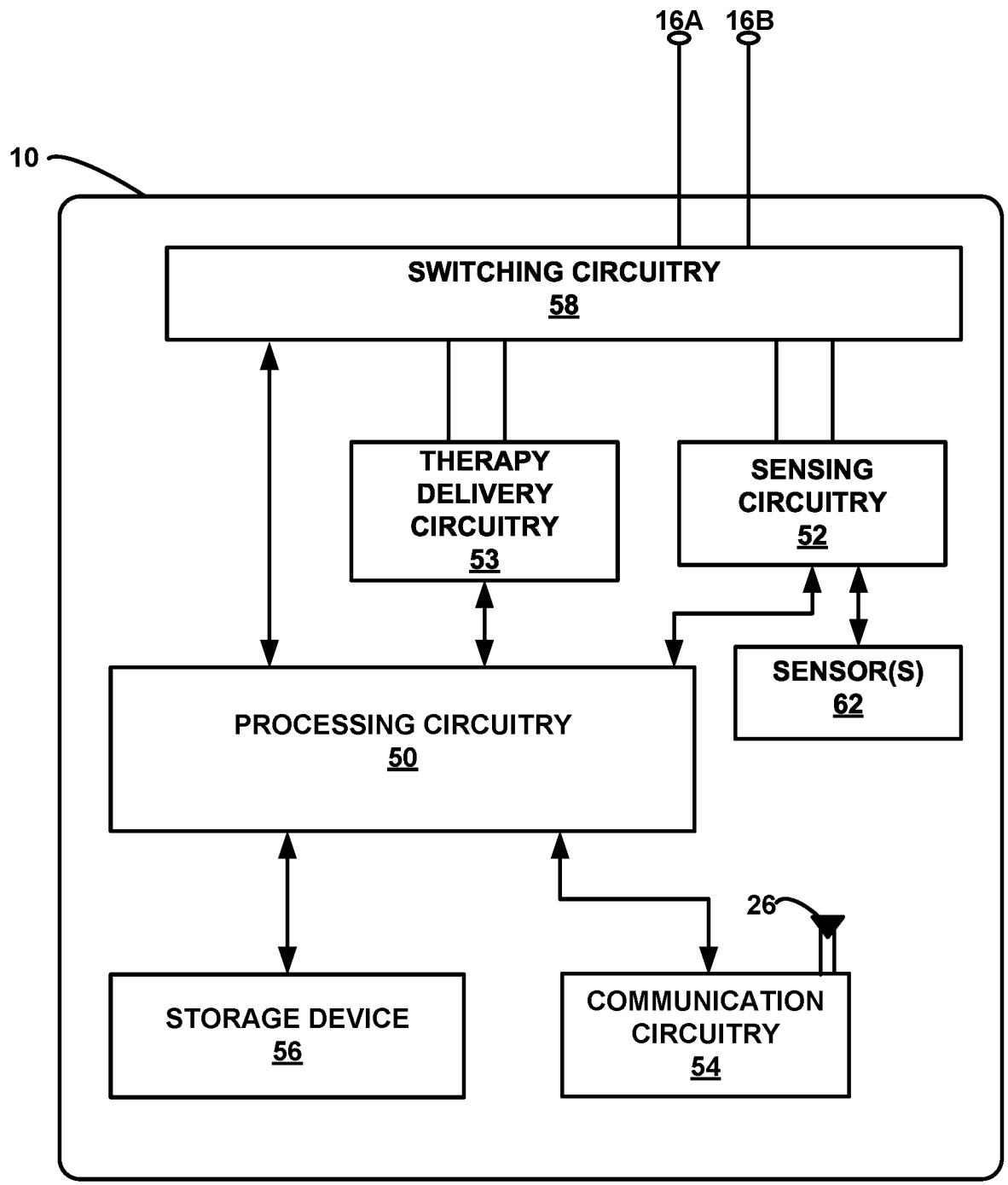
FIG. 2 is a block diagram illustrating an example configuration of a medical device, in accordance with one or more examples of the present disclosure.

FIG. 2 is a block diagram illustrating an example configuration of IMD 10 of FIG. 1 in accordance with one or more techniques described herein. IMD 10 described herein refers to a medical device capable of handling memory interrogations when invoked/requested by an external device over a communication channel between them regardless of link quality. For example, by uploading duplicate copies of time-stamped patient information, IMD 10 may overcome a substantial packet drop rate caused by a weak signal causing, thereby completing a memory interrogation as quickly as possible and/or without waiting for a better link quality. In this matter, the external device may receive requested time-stamped patient information earlier than conventional medical devices and for at least that reason, derive more value from the information when performing patient health monitoring operations.

In the illustrated example, IMD 10 includes electrodes 16A and 16B (collectively "electrodes 16"), antenna 26, processing circuitry 50, sensing circuitry 52, therapy delivery circuitry 53, communication circuitry 54, storage device 56, switching circuitry 58, and sensors 62. Although the illustrated example includes two electrodes 16, IMDs including or coupled to more than two electrodes 16 may implement the techniques of this disclosure in some examples.

Processing circuitry 50 may include fixed function circuitry and/or programmable processing circuitry. Processing circuitry 50 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 50 may include multiple components, such as any combination of one or more microprocessors, one or more controllers, one or more DSPs, one or more ASICs, or one or more FPGAs, as well as other discrete or integrated logic circuitry. The functions attributed to processing circuitry 50 herein may be embodied as software, firmware, hardware or any combination thereof.

Sensing circuitry 52 may be selectively coupled to electrodes 16 via switching circuitry 58, e.g., to sense electrical activity of the heart of patient 4, for example by selecting electrodes 16 and polarity, referred to as the sensing vector, used to sense the cardiac electrical activity, as controlled by processing circuitry 50. Sensing circuitry 52 may sense signals from electrodes 16, e.g., to produce cardiac EGM data or ECG data as examples of the patient data. Sensing circuitry 52 may monitor signals from sensors 62 to process various sensor measurements to include as part of the patient data. Processing circuitry 50 may control one or more of sensors 62 to sense the patient data in some form; examples of one or more sensors 62 to sense patient data include an accelerometer (e.g., a three-axis accelerometer), a pressure sensor, an optical sensor, a gyroscope, a temperature gauge, a moment transducer, and/or the like. Various metrics enable standardized measurement(s) for each sample (e.g., time-stamp) of the sensed patient data and differentiation between multiple samples. In some examples, sensing circuitry 52 may include one or more filters and amplifiers for filtering and amplifying signals received from electrodes 16 and/or sensors 62. Therapy delivery circuitry 53 may deliver electrical therapy, e.g., cardiac pacing, via at least a subset of the available electrodes 16 as selected via switching circuitry 58.

Communication circuitry 54 may include any suitable hardware, firmware, software or any combination thereof for communicating with another device, such as external device 12, another networked computing device, or another IMD or sensor. Under the control of processing circuitry 50, communication circuitry 54 may receive downlink telemetry from, as well as send uplink telemetry to external device 12 or another device with the aid of an internal or external antenna, e.g., antenna 26. In some examples, antenna 26 may comprise a one or more coils. In addition, processing circuitry 50 may communicate with a networked computing device via an external device (e.g., external device 12) and a computer network, such as the Medtronic CareLink® Network. Antenna 26 and communication circuitry 54 may be configured to transmit and/or receive signals via inductive coupling, electromagnetic coupling, Near Field Communication (NFC), Radio Frequency (RF) communication, Bluetooth, WiFi, or other proprietary or non-proprietary wireless communication schemes.

In some examples, storage device 56 includes computer-readable instructions that, when executed by processing circuitry 50, cause IMD 10 and processing circuitry 50 to perform various functions attributed to IMD 10 and processing circuitry 50 herein. Storage device 56 may include any volatile, non-volatile, magnetic, optical, or electrical media, such as a random access memory (RAM), read-only memory (ROM), non-volatile RAM (NVRAM), ferroelectric RAM (FRAM), electrically-erasable programmable ROM (EEPROM), flash memory, or any other digital media. Storage device 56 may store, as examples, programmed values for one or more settings and/or operational parameters of IMD 10 and/or data collected by IMD 10 for transmission to another device using communication circuitry 54. Data stored by storage device 56 and transmitted by communication circuitry 54 to one or more other devices may include the patient data described herein for suspected changes in and/or indications of changes in patient health.

The present disclosure describes IMD 10 as part of a medical system capable of managing data transmissions from IMD 10 regarding its patient, patient 4 of FIG. 1, even when a link quality is poor, via any one of a number of techniques. IMD 10 or another medical device may be implanted into patient 4 with one or more sensors for sensing physiological signals (e.g., an accelerometer continuously measuring patient activity). The medical device may communicate sensed physiological information for their patient to the external computing device, and the software application running on that external computing device may analyze the patient information and perform functionality that provides the patient with some benefit (e.g., provide a report regarding the patient's health, detecting health events, and/or the like).

Sensing circuitry 52 may capture signals from electrodes 16 and/or any one or more of sensors 62, for example, to produce the patient information for processing by hardware/software (e.g., within IMD 10, external device 12, and/or another device), thereby facilitating (e.g., remote) monitoring and detecting changes in patient health (e.g., by an external computing system such as a network-accessible device running a computing service).

Sensing circuitry 52 converts to digital form signals corresponding to the sensed electrical activity and provides the digitized signals to processing circuitry 50 for an initial detection analysis performed by a detection analysis. The patient data information the cardiac EGM data encompassing a period of time (e.g., during which a cardiac episode may have occurred) and, in some examples, includes a sequence of values representing waves/waveforms (e.g., ECG-type waveforms) of a cardiac rhythm. It should be noted that the cardiac EGM data (e.g., for a typical ECG) records a series of samples representing points on waves (e.g., the P wave, Q wave, R wave, S wave, T wave and U wave), intervals (e.g., PR interval, QRS interval (also called QRS duration), QT interval or RR interval), segments (e.g., PR segment, ST segment or TP segment), complex(es) (e.g., QRS complex), and other components. The detection logic may direct processing circuitry 50 to apply a pattern recognition technique to interpret electrical activity vectors recorded in corresponding cardiac EGM data as one or more of the above components. In some examples, the waveform may indicate an initial detection of a cardiac event. Processing circuitry 50 and/or sensing circuitry 52 may read/write the patient data from/to storage device 56.

Processing circuitry 50 and/or communication circuitry 54 may upload the patient information via a communication channel (e.g., a proprietary or non-proprietary wireless connection) to a remote device, such as external device 12 of FIG. 1. Examples of the uploaded patient data include health event data, which may be generated by the above-mentioned detection logic configured to detect occurrences of cardiac episodes, for instance, by determining whether the cardiac EGM data or ECG data is indicative of such cardiac episodes.

For IMD 10 and its patient(s), processing circuitry 50 may achieve an improved success rate for any data transmissions over the communication channel. This may be accomplished through a number of techniques as described herein. In some examples, IMD 10 may receive a control directive invoking an upload of patient information from memory via communication circuitry 54, and in turn, processing circuitry 50 executes a memory interrogation (operation) for which packetized dataset(s) of patient information are transmitted to external device 12 or device(s) 90. It should be understood that the "memory" in "memory interrogation" refers to any type of memory device into which data may be stored (e.g., even temporarily). The present disclosure describes "memory" herein as referring to any volatile, non-volatile, magnetic, optical, electrical media, and/or the like. In the example of FIG. 2, an embodiment for "memory" is illustrated as storage device 56. Therefore, the present disclosure enables memory interrogations involving transmissions in one or both real-time and scheduled and envisions embodiments of IMD 10 for handling uploads in real-time, near real-time and/or in the near future.

One example memory interrogation may request real-time or near real-time patient information, which may include sensed measurements upon capture and/or collection, for instance, by processing circuitry 50, sensing circuitry 52, and/or sensors 62. Responsive to the example memory interrogation request, processing circuitry 50 may access raw signal data from memory device of IMD 10, which may be (a part of) storage device 56 or a separate memory device in IMD 10, and then (e.g., immediately) transmit that raw signal data in packetized datasets where one or more packets are configured with a reduced individual packet size. If processing circuitry 50 analyzes the communication channel and determines satisfaction of at least one link quality criterion, processing circuitry 50 may determine that the satisfaction indicates poor link quality (e.g., a weak signal). In response, processing circuitry 50 may proceed to reducing the individual packet size and then, packetizing the raw signal data into a number of packets that includes at least one duplicate copy of at least one of these packets. Some techniques capable of reducing the individual packet size may do so by altering current or default communication protocol settings to increase a likelihood that the packetized dataset(s) are successfully uploaded (e.g., in their entirety or a substantial portion thereof).

Processing circuitry 50 may employ a number of mechanisms to determine an amount of the individual packet size reduction. Some examples may set forth a bifurcation of a default packet size (e.g., a standard Maximum Transmission Unit (MTU) size of an applicable network protocol for wireless transmissions) such that each packet transmission of patient information is duplexed. To that end, processing circuitry 50 may direct communication circuitry 54 to upload two copies (i.e., one duplicate copy) of each packet (e.g., packetized dataset) over the communication channel.

In some examples, IMD 10 cannot transmit in the near future because external device 12 has directed it to perform a real-time upload of the raw signal data. The above raw signal data may be indicative of cardiac activity that is contemporaneous (e.g., recently) sensed and then, stored in a memory buffer (e.g., CPU register) as part of an (almost) instantaneous outbound communication. For at least this reason, processing circuitry 50 may select a different amount of the individual packet size reduction, for example, based on a time interval in a cardiac cycle (e.g., the packet dropoff period). This buffer may be a part of storage device 56 or a separate memory device in IMD 10. This buffer may be part of some logic circuitry, such as in sensing circuitry 52. The present disclosure envisions other mechanisms for determining an appropriate amount of the individual packet size reduction.

In some examples, IMD 10 may implement an example technique configured to determine the amount of the individual packet size reduction to be commensurate with the number of duplicate copies. For at least this reason, processing circuitry 50 may determine a number of duplicate copies and/or the amount for the individual packet size reduction of each of the packets based on a packet drop rate, a dropout time period, and/or the individual packet size reduction. Examples of the packet drop rate include a current packet drop rate or an expected packet drop rate for a future time period. Other examples may include a specific (e.g., desired) packet drop rate indicative of an acceptable link quality for the communication channel. The specific packet drop rate may be pre-determined or dynamically selected. The specific packet drop rate may be set (e.g., synchronized) to a lowest packet drop rate, thereby avoiding time periods with a higher packet drop rate.

Examples of the dropout time period refer to specific time periods at which a packet drop rate is the highest amongst other time period. The dropout time period may occur contemporaneously with a scheduled or real-time upload of patient information and in response, processing circuitry 50 may select a different time period or decide upon redundancy as a solution. Processing circuitry 50 may determine the number of duplicate copies to fit a size of the current time period or the scheduled time period and proceed to reduce the individual packet size commensurate with the number of duplicate copies to transmit. Processing circuitry 50 may set the same time period or a different time period to which subsequent uploads are synchronized.

Another example memory interrogation may request scheduled transmission of patient information. This patient information may not be transmitted in real-time and may be stored in storage device 56 until its packets are scheduled for upload. This patient information may include raw signal data (e.g., sensed measurements) and processed sensor data (e.g., physiological parameters). This patient information may also be stored in a different memory device than storage device 56. Similar to the first example memory interrogation, processing circuitry 50 may packetize and then, upload (via communication circuitry 54) a dataset of patient information in a different manner than what is set forth under current or default network interface (NIC) settings and/or networking protocol settings to overcome a weak signal on the communication channel with external device 12. By altering these settings, processing circuitry 50 is expected to increase a likelihood that the entire dataset of patient information arrives at external device 12.

Processing circuitry 50 may generate a health event history indicating points-in-time of probable health events (i.e., positive detections). As described in further detail for FIG. 3, external device 12 is an example of a device configured to operate with IMD 10, for example, by providing access to the software application for extending native capabilities of IMD 10 with respect to monitoring and detecting health events. The software application further provides a network connection for communicating with a computing service.

Figure 3:
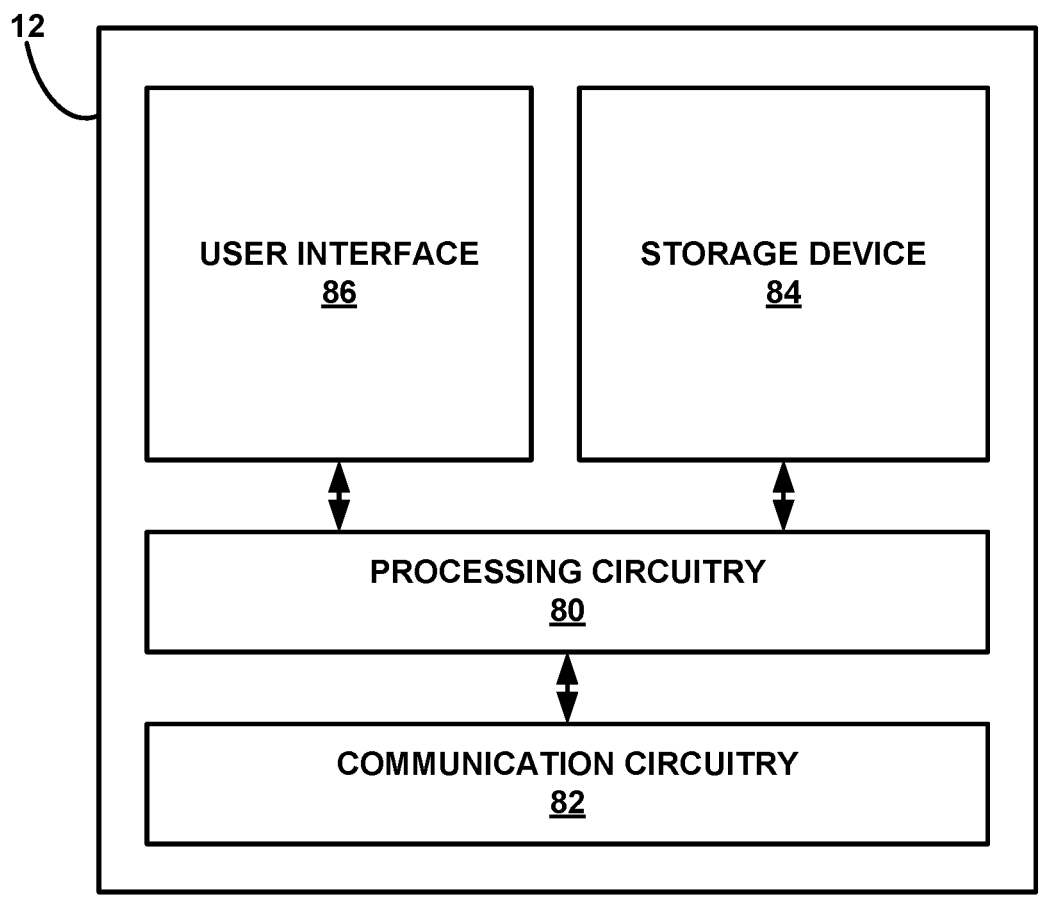
FIG. 3 is a block diagram illustrating an example configuration of the external device of FIG. 1, in accordance with one or more examples of the present disclosure.
Figure 4:
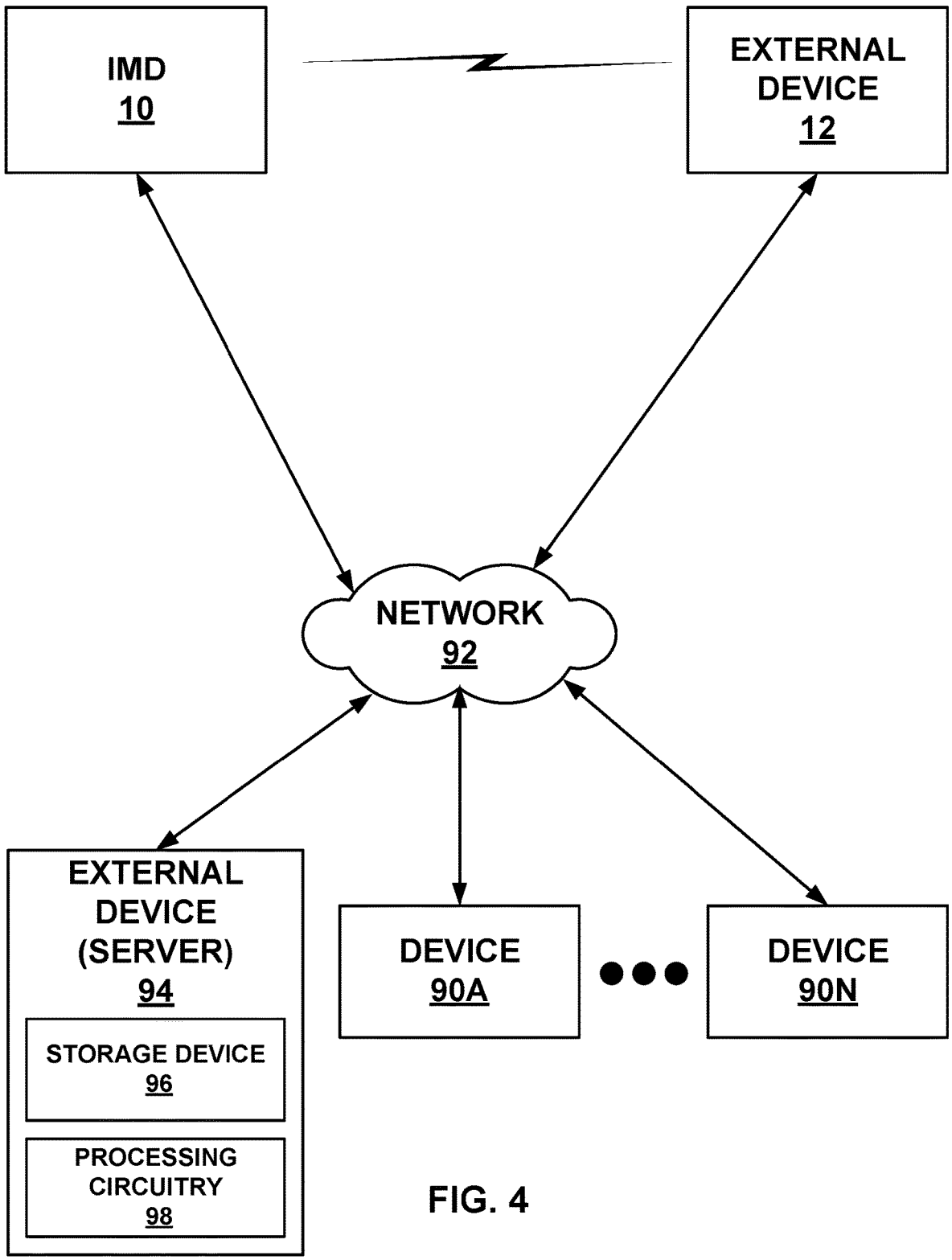
FIG. 4 is a block diagram illustrating an example system that includes an access point, a network, external computing devices, such as a server, and one or more other computing devices, which may be coupled to the medical device and external device of FIGS. 1-3, in accordance with one or more examples of the present disclosure.

FIG. 3 is a block diagram illustrating an example configuration of components of external device 12. In the example of FIG. 4, external device 12 includes processing circuitry 80, communication circuitry 82, storage device 84, and user interface 86.

Processing circuitry 80 may include one or more processors that are configured to implement functionality and/or process instructions for execution within external device 12. For example, processing circuitry 80 may be capable of processing instructions stored in storage device 84. Processing circuitry 80 may include, for example, microprocessors, DSPs, ASICs, FPGAs, or equivalent discrete or integrated logic circuitry, or a combination of any of the foregoing devices or circuitry. Accordingly, processing circuitry 80 may include any suitable structure, whether in hardware, software, firmware, or any combination thereof, to perform the functions ascribed herein to processing circuitry 80.

Communication circuitry 82 may include any suitable hardware, firmware, software or any combination thereof for communicating with another device, such as IMD 10. Under the control of processing circuitry 80, communication circuitry 82 may receive downlink telemetry from, as well as send uplink telemetry to, IMD 10, or another device. Communication circuitry 82 may be configured to transmit or receive signals via inductive coupling, electromagnetic coupling, NFC, RF communication, Bluetooth, WiFi, or other proprietary or non-proprietary wireless communication schemes. Communication circuitry 82 may also be configured to communicate with devices other than IMD 10 via any of a variety of forms of wired and/or wireless communication and/or network protocols.

Storage device 84 may be configured to store information within external device 12 during operation. Storage device 84 may include a computer-readable storage medium or computer-readable storage device. In some examples, storage device 84 includes one or more of a short-term memory or a long-term memory. Storage device 84 may include, for example, RAM, DRAM, SRAM, magnetic discs, optical discs, flash memories, or forms of EPROM or EEPROM. In some examples, storage device 84 is used to store data indicative of instructions for execution by processing circuitry 80. Storage device 84 may be used by software or applications running on external device 12 to temporarily store information during program execution.

Data exchanged between external device 12 and IMD 10 may include control data including commands, device settings, operational parameters, and/or the like. External device 12 may transmit data including computer readable instructions which, when implemented by IMD 10, may control IMD 10 to change one or more operational parameters and/or export collected data. For example, processing circuitry 80 may transmit an instruction to IMB 10 which requests IMD 10 to export collected data (e.g., asystole episode data) to external device 12. In turn, external device 12 may receive the collected data from IMB 10 and store the collected data in storage device 84. The data external device 12 receives from IMD 10 may include episode data (e.g., cardiac EGMs), parameters, patient activity, sensor data, and other patient data described herein.

A user, such as a clinician or patient 4, may interact with external device 12 through user interface 86. User interface 86 includes a display (not shown), such as a liquid crystal display (LCD) or a light emitting diode (LED) display or other type of screen, with which processing circuitry 80 may present information related to IMD 10, e.g., sensor data, physiological parameters, metric values, episode data, or cardiac EGM or ECG. In addition, user interface 86 may include an input mechanism configured to receive input from the user. The input mechanisms may include, for example, any one or more of buttons, a keypad (e.g., an alphanumeric keypad), a peripheral pointing device, a touch screen, or another input mechanism that allows the user to navigate through user interfaces presented by processing circuitry 80 of external device 12 and provide input. In other examples, user interface 86 also includes audio circuitry for providing audible notifications, instructions or other sounds to the user, receiving voice commands from the user, or both.

External device 12 may be any computing device including a network-accessible computing device (e.g., a mobile phone or smart phone). External device 12, which may be known as an edge device or a patient device, for a medical device such as IMD 10 may be capable of operations in support of medical device functionality. External device 12 may be configured with to initiate operation of the medical device (e.g., post-implantation).

External device 12 is an example of a device configured to operate with IMD 10, for example, by providing a software application for interacting with IMD 10 and, in some examples, extending native capabilities of IMD 10 with respect to monitoring and detecting health events. The software application further provides a wireless connection for a communication channel through which data is exchanged between external device 12 and IMD 10.

In some examples, processing circuitry 50 of IMD 10 may generate a database to arrange database records indicating points-in-time of probable health events (i.e., positive detections). The database records may be arranged chronologically (e.g., a history). The software application executing on processing circuitry 80 may receive, via communication circuitry 82, the database records in reduced sized packets over a communication with IMD 10, for example, when a link quality degrades.

FIG. 4 is a block diagram illustrating an example system that includes computing devices 90A-90N (collectively, "computing devices 90" or, simply, "devices 90"), which may be coupled to IMD 10 and external device 12 via network 92, and one or more other computing devices, such as another external device illustrated as server 94, in accordance with one or more techniques described herein. In this example, IMD 10 may use communication circuitry 54 to communicate with external device 12 via a first wireless connection, and to communicate with an access point via a second wireless connection. In the example of FIG. 5, external device 12, server 94, and devices 90 are interconnected and may communicate with each other through network 92.

In some cases, server 94 may be configured to provide a secure storage site for data that has been collected from IMD 10 and/or external device 12. In some cases, server 94 may assemble data in web pages or other documents for viewing by trained professionals, such as clinicians, via devices 90. One or more aspects of the illustrated system of FIG. 5 may be implemented with general network technology and functionality, which may be similar to that provided by the Medtronic CareLink® Network.

In some examples, one or more of devices 90 may be a tablet or other smart device located with a clinician, by which the clinician may program, receive alerts from, and/or interrogate IMD 10. For example, the clinician may access the time-stamped patient information collected by IMD 10 through a device 90, such as when patient 4 is in in between clinician visits, to check on a status of a medical condition. In some examples, the clinician may enter instructions for a medical intervention for patient 4 into an application executed by device 90, such as based on a status of a patient condition determined by IMD 10, external device 12, server 94, or any combination thereof, or based on other patient data known to the clinician.

Device 90 then may transmit the instructions for medical intervention to another device 90 located with patient 4 or a caregiver of patient 4. For example, such instructions for medical intervention may include an instruction to change a drug dosage, timing, or selection, to schedule a visit with the clinician, or to seek medical attention. In further examples, device 90 may generate an alert to patient 4 based on a status of a medical condition of patient 4, which may enable patient 4 proactively to seek medical attention prior to receiving instructions for a medical intervention. In this manner, patient 4 may be empowered to take action, as needed, to address his or her medical status, which may help improve clinical outcomes for patient 4.

In the example illustrated by FIG. 4, server 94 includes a storage device 96, e.g., to store data retrieved from IMD 10, and processing circuitry 98. Although not illustrated in FIG. 4, devices 90 may similarly include a storage device and processing circuitry. Processing circuitry 98 may include one or more processors that are configured to implement functionality and/or process instructions for execution within server 94. For example, processing circuitry 98 may be capable of processing instructions stored in storage device 96. Processing circuitry 98 may include, for example, microprocessors, DSPs, ASICs, FPGAs, or equivalent discrete or integrated logic circuitry, or a combination of any of the foregoing devices or circuitry. Accordingly, processing circuitry 98 may include any suitable structure, whether in hardware, software, firmware, or any combination thereof, to perform the functions ascribed herein to processing circuitry 98. Processing circuitry 98 of server 94 and/or the processing circuitry of device(s) 90 may implement any of the techniques described herein to analyze information, or data received from IMD 10, e.g., to determine whether the health status of a patient has changed.

Storage device 96 may include a computer-readable storage medium or computer-readable storage device. In some examples, storage device 96 includes one or more of a short-term memory or a long-term memory. Storage device 96 may include, for example, RAM, DRAM, SRAM, magnetic discs, optical discs, flash memories, or forms of EPROM or EEPROM. In some examples, storage device 96 is used to store data indicative of instructions for execution by processing circuitry 98.

Figure 5:
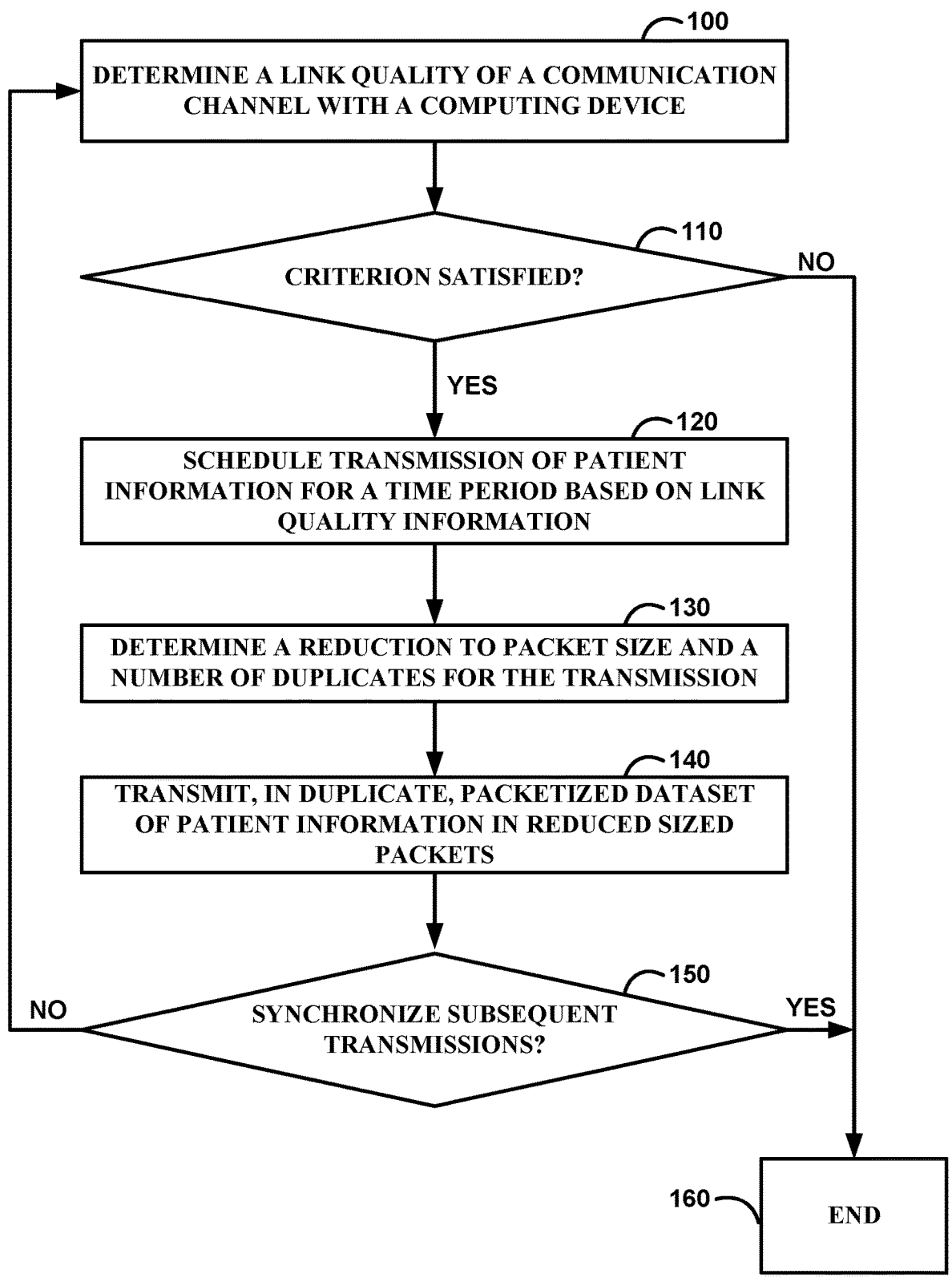
FIG. 5 is a flow diagram illustrating an example operation for configuring an upload of time-stamped patient information as a complete packetized dataset to enable accurate detection of changes in patient health, in accordance with one or more examples of the present disclosure.

FIG. 5 is a flow diagram illustrating an example operation for configuring an upload of time-stamped patient information as a complete packetized dataset to, e.g., enable accurate detection of changes in patient health, in accordance with one or more examples of the present disclosure.

As described herein, processing circuitry 50 of IMD 10 performs the example operation, thereby allowing external device 12 to focus its device functionality (e.g., an analysis for detecting changes in patient health) on a complete dataset of accurate real-time patient information covering an entirety of a time period of interest (or a substantial portion thereof). In general, the example operation facilitates delivery of time-stamped patient information (almost immediately) after its collection and/or storage in memory resources as described herein, regardless of link quality.

In the example operation of FIG. 5, IMD 10 may be programmed to perform an upload of time-stamped patient information in real-time and/or in response to a memory interrogation by external device 12 or another computing device. To the collect the time-stamped patient information, processing circuitry 50 of IMD 10 monitors and then, records sensor signals (e.g., measurements) and physiological data (e.g., values) generated by sensing circuitry 52 of IMD 10.

In some examples, processing circuitry 50 of IMD 10 determines a link quality of a communication channel with external device 12 (100). The link quality may be assessed as a general qualitative measure or, as an alternative, specifically for predicting a successful upload of the patient information contemporaneous with its recording. The determined link quality may correspond with a particular point-in-time (e.g., an interval) in a cycle (e.g., a cardiac cycle).

According to the example operation of FIG. 5, processing circuitry 50 of IMD 10 determines satisfaction of one or more criterion for assessing the link quality and, possibly, other metrics (110). Based on determining satisfaction of the one or more criterion (YES of 110), processing circuitry 50 of IMD 10 proceeds to schedule transmission of patient information for a time period based on link quality information of the communication channel (120). The link quality information may provide statistics specific for that time period or an entire cycle (e.g., a physiological cycle such as a cardiac cycle). Processing circuitry 50 of IMD 10 proceeds to determine a reduction to an individual packet size and a number of duplicates to include in the transmission (130) based on these statistics. The reduction, which may be commensurate with the number of duplicates, causes IMD 10 to generate each packet included in the transmission with a reduced packet size. In some examples, the reduction to packet size and number of duplicates may be fixed, rather than variable based on the link quality statistics.

Processing circuitry 50 of IMD 10 prepares for and then, performs the transmission of the patient information (including a number of duplicates) by packetizing a dataset of the patient information into a number of packets where the individual packet size is reduced by a factor and creating duplicate copies of the packetized dataset equal to the number of duplicates commensurate with the reduced packet size. In some examples, processing circuitry 50 of IMD 10, responsive to a clock indicating a (e.g., starting) point-in-time within the scheduled time period, initiates the transmission of the patient information as part of a (e.g., periodic) memory interrogation for external device 12. Processing circuitry 50 of IMD 10 proceeds to transmit, in duplicate, a packetized dataset of the patient information in reduced sized packets (140).

The above transmission completes an upload of patient information to external device 12 for a health event detection analysis. This transmission of reduced sized packets and duplicate copies ensures delivery of the patient information to facilitate that analysis. External device 12 may request periodic uploads of real-time data in which case subsequent transmissions of new or updated patient information may be cyclical; accordingly, IMD 10 may be programmed to perform the periodic uploads at intervals of the same time period of the initial transmission. These transmissions may be synchronized to intervals in the cardiac cycle, including between contractions of the patient's heart.

As illustrated, processing circuitry 50 of IMD 10 determines whether to synchronize subsequent transmissions to a certain time period or to schedule one or more subsequent transmissions using a different method (150). One example of such a different method is to schedule at least a next transmission to a time period that may be pre-determined or selected dynamically.

Based on a determination to synchronize the subsequent transmissions (YES of 150), processing circuitry 50 of IMD 10 proceeds to schedule the subsequent transmissions of the patient information for the same time period scheduled for the above transmission or for another time period. In some alternative examples, processing circuitry 50 of IMD 10 synchronizes the transmission to a time period encompassing an interval in the cardiac cycle. Based on determining not to synchronize the subsequent transmissions (NO of 150), processing circuitry 50 of IMD 10 proceeds to schedule transmission of the patient information for another time period by repeating the example operation, for example, to upload patient information as such data is recorded (100).

Based on determining at least one criterion is not satisfied (NO of 110), processing circuitry 50 of IMD 10 proceeds to schedule transmission of the patient information for yet another different time period. This may be a conventional packet transmission where one or more packets are of a standard packet size instead of a reduced packet size.

The example operation allows IMD 10 to overcome challenges related to link quality (e.g., poor link quality) and provide, in real-time or near real-time, the necessary data for the analysis and any other patient monitoring operation. Having such data without a delay in the timeliness of the patient information provided enables external device 12 to perform an accurate and immediate detection of any non-trivial changes in patient health. External device 12 leverages the availability of that data to quickly invoke functionality for patient monitoring operations in an attempt to provide medical care to the patient as close as possible to an onset of the non-trivial changes in patient health.

The order and flow of the operation illustrated in FIG. 6 is an example. In other examples according to this disclosure, more or fewer criterion (e.g., thresholds) may be considered. Further, in some examples, processing circuitry may perform or not perform the method of FIG. 5, or any of the techniques described herein, as directed by a user, e.g., via external device 12 or computing devices 90. For example, a patient, clinician, or other user may turn on or off functionality for identifying changes in patient health (e.g., using Wi-Fi or cellular services) or locally (e.g., using an application provided on a patient's cellular phone or using a medical device programmer).

The techniques described in this disclosure may be implemented, at least in part, in hardware, software, firmware, or any combination thereof. For example, various aspects of the techniques may be implemented within one or more microprocessors, DSPs, ASICs, FPGAs, or any other equivalent integrated or discrete logic QRS circuitry, as well as any combinations of such components, embodied in external devices, such as physician or patient programmers, stimulators, or other devices. The terms "processor" and "processing circuitry" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as RAM, DRAM, SRAM, FRAM, magnetic discs, optical discs, flash memories, or forms of EPROM or EEPROM. The instructions may be executed to support one or more aspects of the functionality described in this disclosure.

In addition, in some aspects, the functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements. The techniques of this disclosure may be implemented in a wide variety of devices or apparatuses, including an IMD, an external programmer, a combination of an IMD and external programmer, an integrated circuit (IC) or a set of ICs, and/or discrete electrical circuitry, residing in an IMD and/or external programmer.

What is claimed is:

1. A medical system in which a medical device of a patient is communicatively coupled to a computing device, the medical system comprising:
   memory storing a dataset of time-stamped patient information for upload over a time period via a communication channel between the medical device and the computing device; and
   processing circuitry configured to:
      determine that at least one link quality criterion for the communication channel is satisfied by link quality information of the communication channel; and
      based on satisfaction of the at least one link quality criterion, transmit, from the memory and over the communication channel, a number of packets comprising duplicate copies of the dataset packetized with an individual packet size reduction, wherein a number of the duplicate copies is set to be commensurate with the individual packet size reduction.

2. The medical system of claim 1, wherein to transmit the number of packets, the processing circuitry is further configured to:
   determine a number of duplicate copies of each of the packets based on at least one of a packet drop rate, a dropout time period, or the individual packet size reduction.

3. The medical system of claim 1, wherein to transmit the number of packets, the processing circuitry is further configured to:
   determine the individual packet size reduction based on the link quality information of the communication channel.

4. The medical system of claim 1, wherein to transmit the number of packets, the processing circuitry is further configured to:
   determine that the satisfaction of the at least one link quality criterion indicates poor link quality.

5. The medical system of claim 1, wherein to transmit the number of packets, the processing circuitry is further configured to:
   schedule the upload of the time-stamped patient information for a time period based on the link quality information.

6. The medical system of claim 5, wherein to transmit the number of packets, the processing circuitry is further configured to:
   based on an individual packet size, determine an amount of the time period to allot for the upload of the packetized dataset.

7. The medical system of claim 1, wherein to transmit the number of packets, the processing circuitry is further configured to:
   synchronize the upload of the time-stamped patient information for a time interval of a patient cardiac cycle based on a corresponding packet rate of that time interval.

8. The medical system of claim 7, wherein to transmit the number of packets, the processing circuitry is further configured to:
   schedule subsequent uploads of time-stamped patient information for the time interval of the patient cardiac cycle; and
   in response to updated link quality information, adjust the time period of the patient cardiac cycle and synchronize a next upload of time-stamped patient information for the adjusted time period of the patient cardiac cycle.

9. The medical system of claim 1, wherein the time period corresponds to heart contractions of the patient causing an antenna of the medical device to cycle through a null in a coupling between the antenna and an antenna of the computing device.

10. The medical system of claim 9, wherein the satisfaction of the at least one link quality criterion indicates a weak signal and wherein to transmit the number of packets, the processing circuitry is further configured to:
    resend one or more of the number of packets to cause an increase in a communication success rate of the medical device.

11. A medical device, comprising:
    communication circuitry communicatively coupled to a computing device via a communication channel;
    sensing circuitry configured to sense time-stamped patient information based on signals generated by one or more sensors;
    memory storing a dataset of the time-stamped patient information for upload over a time period via the communication circuitry; and
    processing circuitry configured to:
       determine that at least one link quality criterion for a communication channel between the medical device and the computing device is satisfied by link quality information of the communication channel; and based on satisfaction of the at least one link quality criterion, transmit, from the memory and over the communication channel, a number of packets comprising duplicate copies of the dataset packetized with an individual packet size reduction, wherein a number of the duplicate copies is set to be commensurate with the individual packet size reduction.

12. The medical device of claim 11, wherein the one or more sensors comprise at least one electrode configured to sense electrical activity of the time-stamped patient information.

13. The medical device of claim 11, wherein the sensing circuitry is further configured to sense a cardiac electrogram (EGM) via at least one electrode.

14. The medical device of claim 11 further comprising a housing configured to contain the communication circuitry, the memory, and the processing circuitry, wherein the housing is configured to be implanted at least one of within or on a heart of the patient.

15. The medical device of claim 11, wherein to transmit the number of packets, the processing circuitry is further configured to:
determine a number of duplicate copies of each of the packets based on the individual packet size reduction.

16. The medical device of claim 11, wherein to transmit the number of packets, the processing circuitry is further configured to:
determine the reduction to the individual packet size based on the link quality information of the communication channel.

17. The medical device of claim 11, wherein to transmit the number of packets, the processing circuitry is further configured to:
determine a number of duplicate copies of each of the packets based on at least one of a packet drop rate or a dropout time period.

18. The medical device of claim 11, wherein to transmit the number of packets, the processing circuitry is further configured to:
schedule the upload of the time-stamped patient information for a time period based on the link quality information.

19. The medical device of claim 11, wherein to transmit the number of packets, the processing circuitry is further configured to:
synchronize the upload of the time-stamped patient information for a time interval of a patient cardiac cycle based on a corresponding packet drop rate for that time interval.

20. The medical device of claim 19, wherein to transmit the number of packets, the processing circuitry is further configured to:
schedule subsequent uploads of time-stamped patient information for the time interval of the patient cardiac cycle; and
in response to updated link quality information, adjust the time period of the patient cardiac cycle and synchronize a next upload of time-stamped patient information for the adjusted time period of the patient cardiac cycle.

* * * * *